United States Patent [19]
Mosshart et al.

[11] 3,871,720
[45] Mar. 18, 1975

[54] TRACTION TREAD BAND
[75] Inventors: Crockett Mosshart; Paul Steve Martinkovic, both of Detroit, Mich.
[73] Assignee: Uniroyal, Inc., New York, N.Y.
[22] Filed: July 31, 1973
[21] Appl. No.: 384,187

[52] U.S. Cl.................... 305/51, 152/187, 305/54
[51] Int. Cl............................................ B62d 55/26
[58] Field of Search .......... 152/167, 172, 173, 174, 152/175, 182, 185, 187, 191, 209 R, 222, 225, 226, 227, 228; 301/44 R, 44 T, 44 A, 41 R, 43; 305/51, 54, 35 R

[56] References Cited
UNITED STATES PATENTS
2,329,582  9/1943  Bishop .............................. 305/51 X
3,117,824  1/1964  Wadsworth et al.................. 305/51
3,490,510  1/1970  Maiocchi........................... 152/187
3,578,052  5/1971  Petersons........................... 152/187

Primary Examiner—Robert B. Reeves
Assistant Examiner—Larry H. Martin
Attorney, Agent, or Firm—Philip Sands, Esq.

[57] ABSTRACT

A traction tread band for being removably mounted upon the tread portion of a pneumatic tire. The tread band comprises an inextensible rubberized annular band adapted for tightly surrounding and abutting against the tire tread portion upon inflation of the tire, and a circumferential array of alternating rigid blades and rubberized pads affixed to the exterior of the band for enhancing tire traction on soft and hard road-beds, respectively. The pads have a slightly greater radial extent than do the blades and act to radially space the latter and absorb shock from a hard road-bed.

8 Claims, 5 Drawing Figures

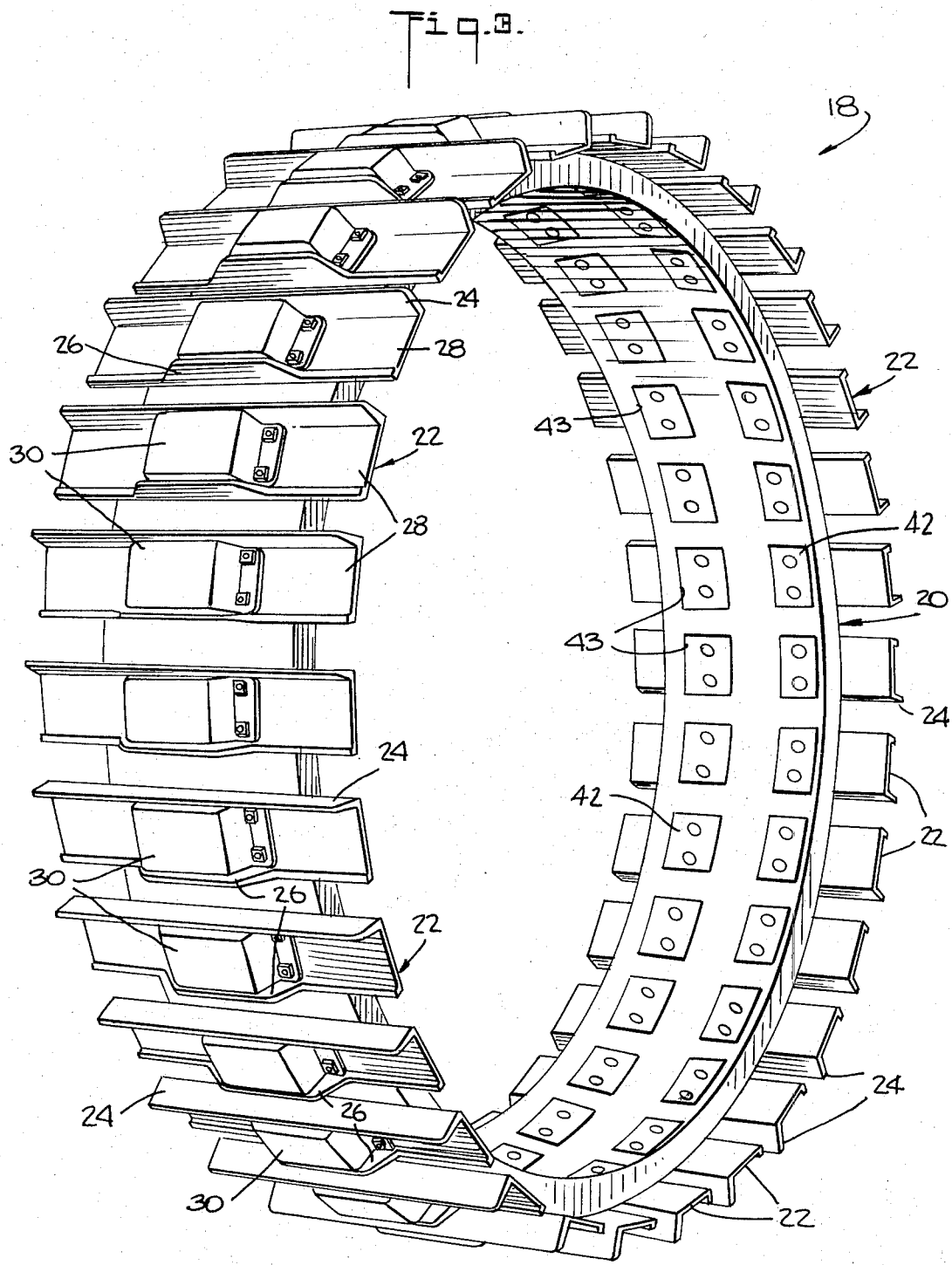

TRACTION TREAD BAND

BACKGROUND OF THE INVENTION

The present invention relates generally to a traction tread band which can be removably mounted, surroundingly, upon a conforming tread portion of a pneumatic tire for off-the-road vehicles. More particularly, the present invention relates to a tread band having metallic grouser bars. The grouser bars optimize tire traction on a soft road-bed such as soil or mud. The tread band, however, may also be used harmlessly for relatively short distances on hard road-beds, such as public highways and the like, without having to be removed and exchanged for one from which there are absent grouser bars or for one that is entirely elastomeric.

In this respect, off-the-road vehicles, namely vehicles for the military or for construction and the like, which are to be operated most often upon soil or mud, require an enhanced degree of traction on such soft road-beds. Traction of this nature is often provided by non-shock absorbing, radially projecting, rigid, preferably metallic, elements arranged circumferentially of the tire upon an entirely rigid annular band. The projecting rigid elements act to gouge the soft road-bed and prevent slipping of the tire as it rotates.

However, off-the-road vehicles must often traverse public highways, either along the highway for short distances or across the highway from one site to another. Since the rigid assemblies cannot absorb road shock, the projecting rigid elements and the band upon which they are mounted must be removed temporarily from the tire so as not to damage the highway or, in the alternative, so as not to be damaged themselves. Temporary removal thereof for highway negotiation, and subsequent remounting thereof for soft road-bed traction, is time consuming, costly and clearly undesirable.

Moreover, since such rigid assemblies cannot absorb road shocks, they leave the entire shock-absorbing capacity of the vehicle to the vehicular suspension system which may at times be overloaded and damaged thereby.

Another disadvantage of such rigid assemblies is that they are inherently of massive weight and notoriously require the vehicle upon which they are mounted to consume excessive fuel.

SUMMARY OF THE INVENTION

Accordingly, it is an object of the present invention to provide a traction tread band which can be removably mounted upon a pneumatic tire for off-the-road vehicles, i.e. tractors, bulldozers, military-servicing vehicles etc.

It is another object of the present invention to provide a removable, shock-absorbing, tread band for pneumatic tires which optimizes tire traction on a soft road-bed by means of rigid traction blades or the like affixed thereto, yet can be used harmlessly, with reduced fuel expenditure, for short distances upon hard road-beds (public highways and the like) without having to be exchanged for one from which there are absent the blades or for one that is entirely of rubberized composition.

It is still another object to provide a tread band which is readily removable from the tire, upon partial deflation of the latter, when it is necessary to traverse relatively long distances over a public highway so that it may be, if desired, exchanged for one that is entirely elastomeric.

To this end, the present invention relates to a pneumatic tire and a removable tread band therefor. The tread band comprises an inextensible rubberized annular band removably mountable surroundingly upon a conforming tread portion of the tire, a circumferential array of metallic traction blades affixed to the annular band for enhancing tire traction on a substantially soft road-bed, and a circumferential array of rubberized pads of increased radial extent affixed to the annular band alternately between adjacent blades for radially spacing the latter and absorbing shock from a substantially hard road-bed.

BRIEF DESCRIPTION OF THE DRAWINGS

The above and additional objects and advantages of this invention will be more clearly understood from the following detailed description thereof when read in conjunction with the accompanying drawings, in which:

FIG. 5 is an enlarged, cross-sectional, fragmentary view taken along the line 5—5 in FIG. 1.

DETAILED DESCRIPTION OF THE INVENTION

Figure 2:
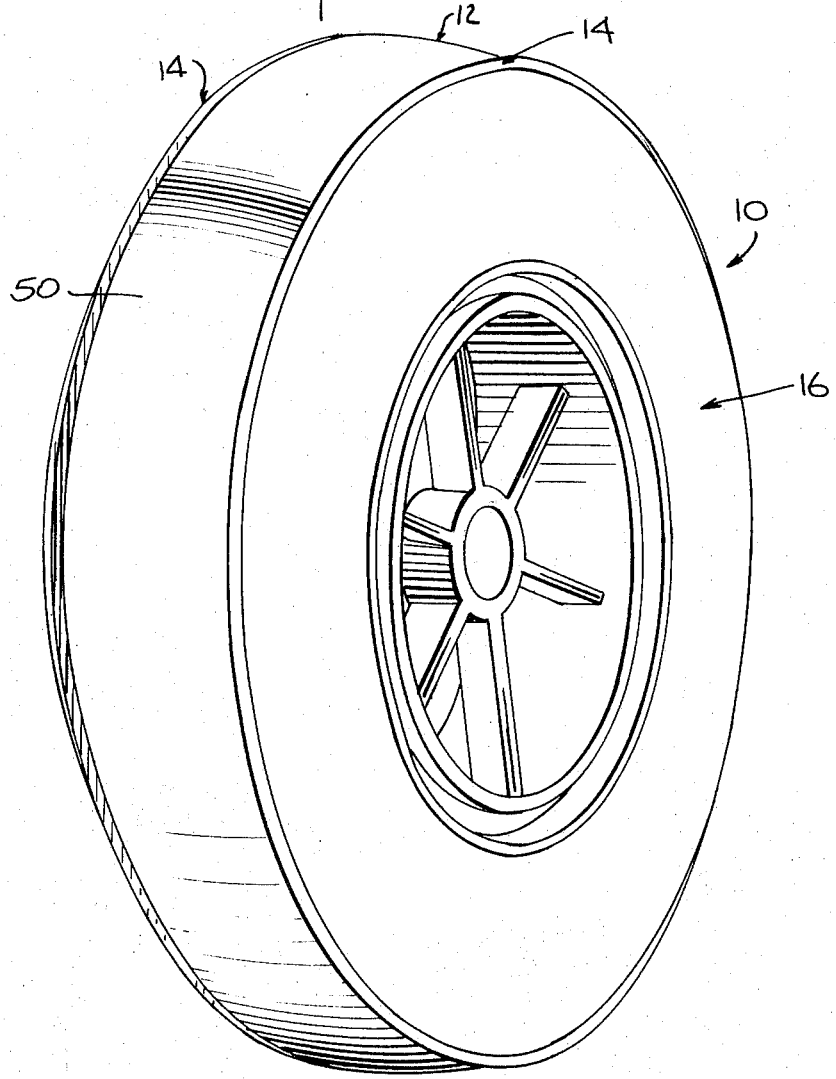
FIG. 2 is a perspective view illustrating the pneumatic tire and its tread portion for receiving the tread band prior to mounting of the latter thereupon.

Referring now to the drawings, and more particularly to FIG. 2, there is illustrated a pneumatic tire 10 having a tread portion 12 from which there are absent, preferably, conventional tread grooves and the like. The tread portion 12, preferably, has a Durometer hardness of 66. Circumferentially along the tread portion 12, there extends a pair of spaced annular flanges 14, each adjacent a respective tire side wall 16.

Figure 3:
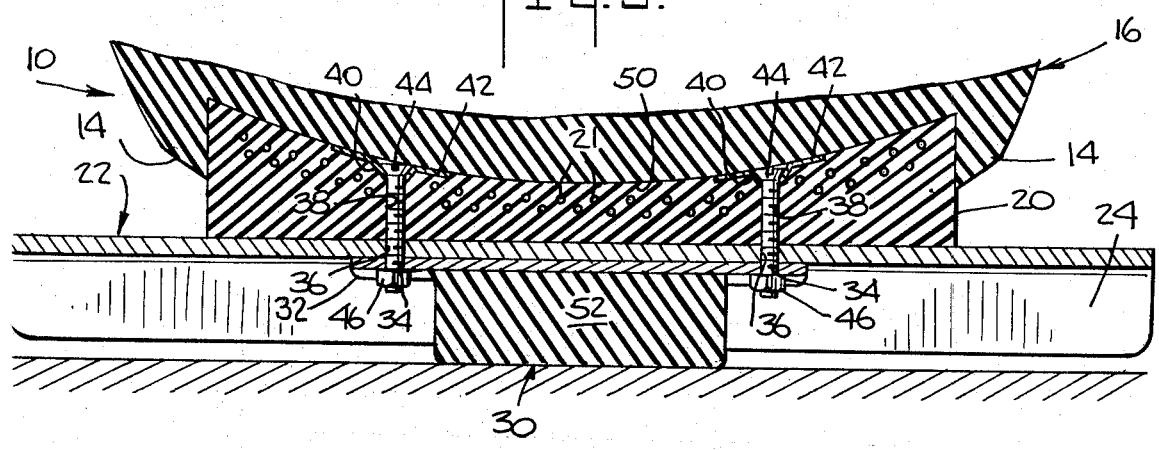
FIG. 3 is a perspective view illustrating the tread band.

A composite tread band 18, illustrated in FIG. 3, is provided for being removably mounted surroundingly upon the tread portion 12 between the flanges 14. The tread band 18 comprises an elastomeric annular band 20 in which is encapsulated annularly a plurality of inextensible metal cords 21. The band 20 may be constituted of natural or synthetic rubber, or any other elastomeric material commonly used for fabricating conventional treads and/or pneumatic tires. The band 20 preferably has a Durometer hardness of 66 at its innermost surface and 55–60 at its outermost surface. The cords 21 extend in substantially parallel relation at an angle of preferably, though not necessarily, 0° relative to a median equatorial plane of the band 20.

Fastened to the exterior of the annular band 20 is a circumferential array of rigid, preferably metallic, grouser bars 22. Each of the grouser bars 22 is generally U-shaped in cross-section and presents a pair of limbs 24 and 26, respectively, which are substantially radially directed and integral with one another through the intermediary of a transition portion 28. The limb 24 of each of the grouser bars 22 has a greater axial extent than its associated limb 26 and may be characterized as a cleat or blade for gouging a soft road-bed such as soil or mud and the like. The transition portion 28, between the limbs 24 and 26, has an axial extent similar to that of the longer limb 24 and acts to bear the weight of the tire upon the exposed or upper surface of the soft road-bed.

A circumferential array of elastomeric or rubberized pads 30 is fastened to the annular band 20, the pads 30 being disposed alternately between adjacent ones of the blades or limbs 24. Each pad 30 is constituted of natural or synthetic rubber having little flexibility, and preferably a Durometer hardness of 63–65. The pads 30 are each provided with a greater radial extent than the substantially radially directed extent of the limbs 24 and 26. Preferably, pursuant to the present invention, one pad 30 is interposed between the limbs 24 and 26 of each grouser bar 22, and is fastened to the undersurface of each transition portion 28. The spacing between the pads 30 is preferably approximately the span of each pad 30 circumferentially of the band 20.

Figure 4:
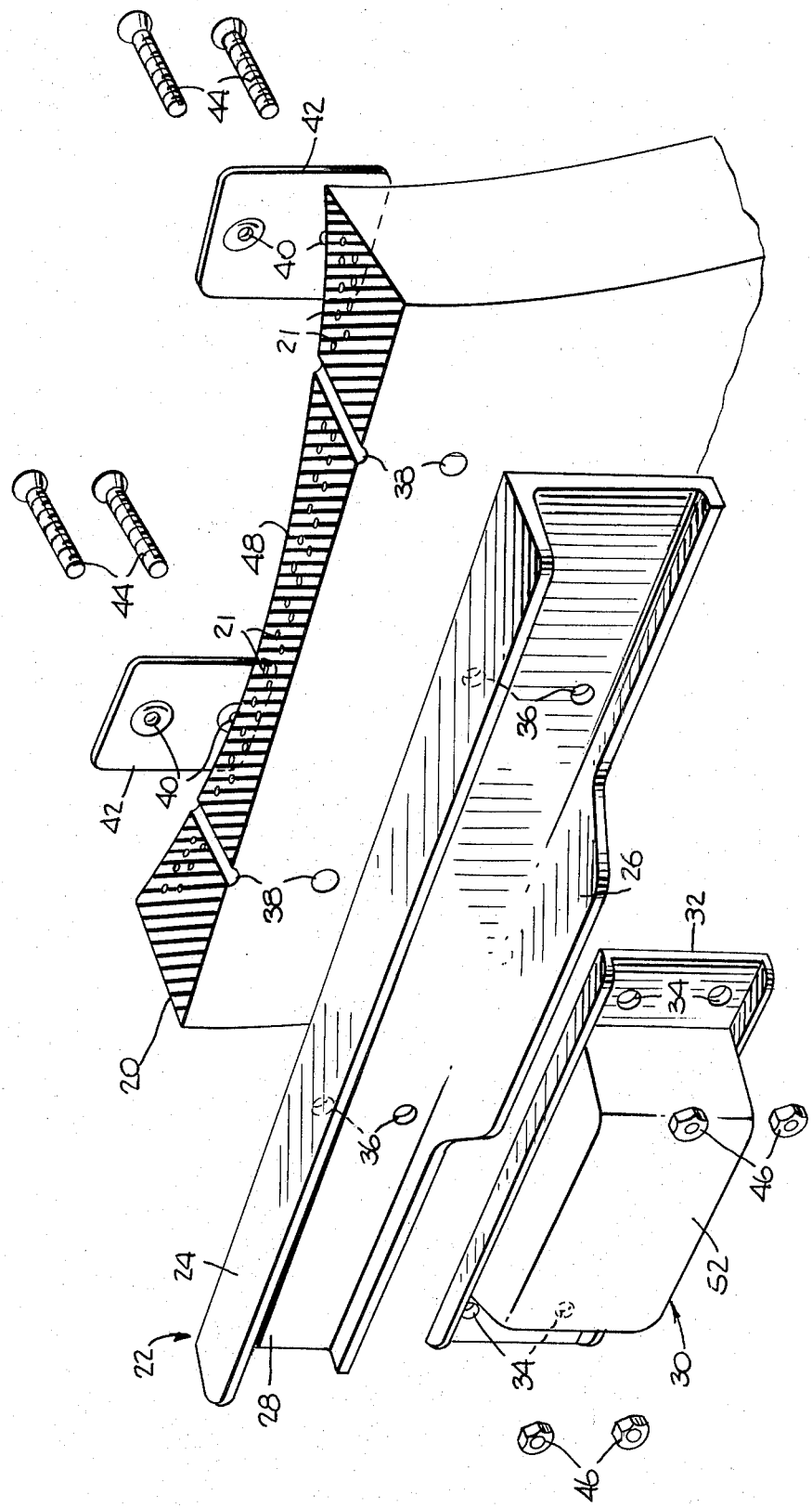
FIG. 4 is an exploded perspective view of a portion of the tread band.

Each pad is affixed preferably by vulcanization or curing to a respective metal underplate 32 (FIG. 4) having exposed apertures 34 on each side of its associated pad. The transition portion 28 of each grouser bar 22 and the band 20 are provided with apertures 36 and 38, respectively, which correspond with the underplate apertures 34. These apertures when properly aligned permit fastening of each grouser bar 22 and its associated pad 30 to the exterior of the band 20. Fastening may be achieved by inserting fastening elements, such as bolts 44, through the correspondingly aligned apertures, and threadedly anchoring the bolts 44 such as by means of respective nuts 46.

Since the band 20 is elastomeric, it is preferred to place metal cover plates 42 along the interior of the band 20 into respective pre-formed receptacles 43 (FIG. 3) such that respective sunken apertures 40 in the cover plates 42 are aligned with corresponding ones of the band apertures 38 to receive and reinforce the respective heads of the bolts 44 from the interior of the band 20. In this manner, the band 20 is reinforced locally by the correspondingly opposed cover plates 42 and grouser bars 22 which are disposed, respectively, along the interior and exterior of the band 20.

Figure 1:
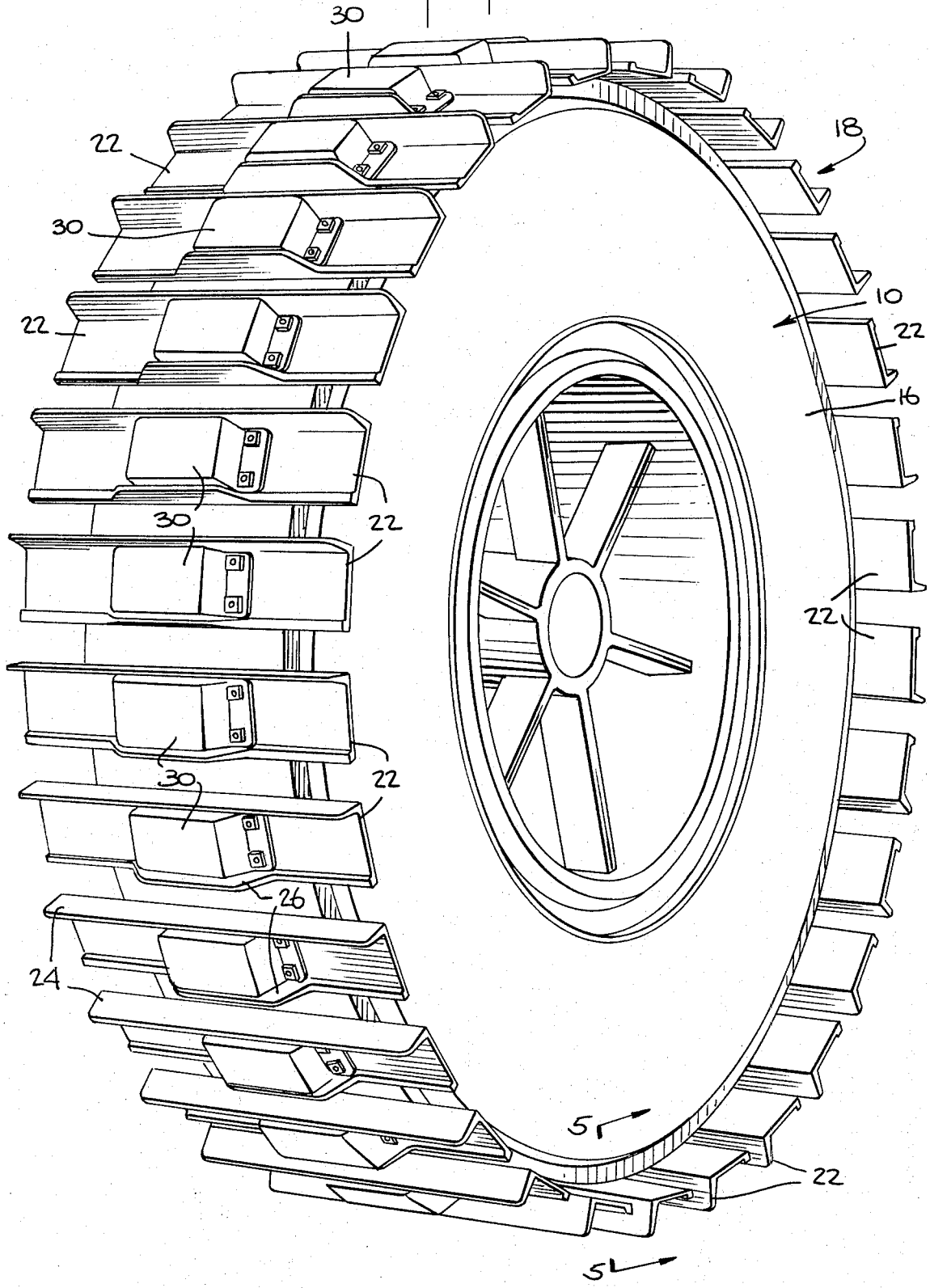
FIG. 1 is a perspective view illustrating the tread band of the present invention assembled on a pneumatic tire.

As illustrated in FIG. 1, the composite tire tread band 18 may be readily mounted upon the pneumatic tire 10, simply by deflating the latter and sliding the composite tread band 18 over and beyond one of the flanges 14 and upon the tire tread portion 12. The relationship of the composite tread band 18 with that of the tire tread portion 12 is such that an inner cross-sectionally concave circumferential surface 48 presented by the interior of the elastomeric annular band 20 conforms and frictionally resists slipping relative to an outer cross-sectionally convex circumferential surface 50 presented between the flanges 14 by the tire tread portion 12, upon inflation of the latter. The axial width of the annular band 20 is such that it circumferentially abuts on each side thereof against the circumferentially extending flanges 14. This prevents axial shifting of the tread band 18 relative to the inflated pneumatic tire 10.

With the composite tread band 18 assembled upon the pneumatic tire 10, a vehicle upon which the tire 10 is mounted is in a condition to be driven over both soft and hard road-beds alike. In this respect, each of the grouser bars 22 acts as traction means for enhancing tire traction upon a soft road-bed constituted of mud or soil and the like. The blades or limbs 24 of the grouser bars 22, respectively, act in succession to gouge the soft surface of the soil and prevent slipping of the tire 10 as the latter rotates. The associated transition portions 28, however, act in succession to bear the weight of the tire 10 and prevent the latter from sinking deeply into the soil.

When it is necessary for the vehicle to be driven along the hard road-bed of a public highway or the like, there is no necessity to exchange the composite tread band 18 for one from which there are absent the grouser bars 22 or for one which is entirely elastomeric. In this respect, since each of the elastomeric pads 30 is constituted of a relatively hard rubberized compound having little flexibility and has a greater radial extent relative to the pneumatic tire 10 than do the limbs 24 and 26 of each of the grouser bars 22, the outer road-contacting surface 52 of each of the pads 30 extends and remains sufficiently radially beyond the free edge of each of the limbs 24 and 26 and thereby radially spaces each of the latter limbs from the hard road-bed. Thus, each pad 30 acts to absorb hard road-bed shock while providing necessary traction.

Each of the limbs 26, which are of lesser axial extent than the limbs 24, but which correspond axially to that of the pads 30, serves as means for protecting, reinforcing and stabilizing the pads 30 against shearing as the latter exert traction forces against a hard roadbed. Thus, a vehicle upon which is mounted the composite tread band 18 may be suitably driven at low speeds and for short distances upon a hard road-bed offered by public highways and the like, from one site (construction or otherwise) to another, without necessity for exchanging the tread band 18 for one which is entirely elastomeric. However, when it is necessary to traverse long distances over a public highway, the composite tread band 18 can be readily exchanged for one that is entirely elastomeric, this because of the readily removable nature thereof upon deflating the tire 10.

Numerous alterations of the structure herein disclosed will suggest themselves to those skilled in the art. However, it is to be understood that the present disclosure relates to a preferred embodiment of the invention which is for purposes of illustration only and not to be construed as a limitation of the invention.

What is claimed is:

1. In combination, a pneumatic tire and a removable tread band therefor, said tread band having a continuously flexible, inextensible, annular band removably mountable, surroundingly, upon a conforming tread portion of said tire, the improvement comprising: a circumferential array of spaced rigid traction means affixed to said annular band for enhancing tire traction on a substantially soft road-bed; and a circumferential array of spaced elastomeric traction means affixed to said annular band for radially spacing said rigid traction means and absorbing shock from a substantially hard road-bed, said rigid and elastomeric traction means alternating with one another circumferentially of said annular band, said annular band to which are affixed said alternating rigid and elastomeric traction means being at least partially radially compressible for cooperating with said elastomeric traction means and said tire to absorb hard road-bed shocks, said rigid traction means including a plurality of substantially U-shaped grouser bars each of which in cross-section presents a pair of limbs and a transition portion integrally interconnecting said limbs, said elastomeric traction means including a plurality of pads each of which is confined between and embraced by a respective pair of limbs of a corresponding one of said grouser bars, each of said pads having a greater radial extent than the pair of limbs embracing it, each of said pairs of limbs constituting means for resisting shearing of the pad it embraces due to traction forces generated upon a hard road-bed, each of said transition portions constituting means for bearing the weight of the tire upon a soft road-bed and having an undersurface to which a respective one of said pads is fastened, at least one limb of each of said pairs of limbs having a greater axial extent than its associated pad and constituting a blade for gouging the surface of a soft road-bed.

2. The combination as claimed in claim 1, wherein said free edges of said blades, respectively, extend axially beyond each side of both said annular band and said tire.

3. The combination as claimed in claim 1, wherein the other of said limbs of each pair has a lesser axial extent than said limbs which constitute said blades but conforms substantially to the axial extent of said pads.

4. The combination as claimed in claim 1, wherein said rigid traction means is metallic and said elastomeric traction means is of hard rubberized compound.

5. The combination as claimed in claim 1, wherein said annular band is of rubber composition, and includes a plurality of inextensible metallic cords annularly embedded therein.

6. The combination as claimed in claim 1, wherein said tread portion of said tire includes means for resisting movement of said tread band axially relative thereto.

7. The combination as claimed in claim 6, wherein the latter said means includes a pair of circumferentially extending flanges spaced axially from one another over a distance corresponding to the width of said annular band.

8. A tread band for being removably mounted upon a tread portion of a pneumatic tire, said tread band comprising: a continuously flexible, inextensible, annular band adapted for abutting against and surrounding said tread portion of said pneumatic tire; a circumferential array of spaced rigid traction means affixed to said annular band for enhancing tire traction on a substantially soft road-bed; and a circumferential array of spaced elastomeric traction means affixed to said annular band for radially spacing said rigid traction means and absorbing shock from a substantially hard road-bed, said rigid and elastomeric traction means alternating with one another circumferentially of said annular band, said annular band to which are affixed said alternating rigid and elastomeric traction means being at least partially radially compressible for cooperating with said elatomeric traction means and said tire to absorb hard road-bed shocks, said rigid traction means including a plurality of substantially U-shaped grouser bars each of which in cross-section presents a pair of limbs and a transition portion integrally interconnecting said limbs, said elastomeric traction means including a plurality of pads each of which is confined between and embraced by a respective pair of limbs of a corresponding one of said grouser bars, each of said pads having a greater radial extent than the pair of limbs embracing it, each of said pairs of limbs constituting means for resisting shearing of the pad it embraces due to traction forces generated upon a hard road-bed, each of said transition portions constituting means for bearing the weight of the tire upon a soft road-bed and having an undersurface to which a respective one of said pads is fastened, at least one limb of each of said pairs of limbs having a greater axial extent than its associated pad and constituting a blade for gouging the surface of a soft road-bed.

* * * * *